US007715017B2

(12) United States Patent
Lacey (10) Patent No.: US 7,715,017 B2
(45) Date of Patent: May 11, 2010

(54) DYNAMIC FRINGE PHASE DETECTION FOR MEASUREMENT OF VERY SMALL SPACING

(75) Inventor: Christopher Allen Lacey, San Diego, CA (US)

(73) Assignee: MicroPhysics Inc, Carlsbad, CA (US)

( * ) Notice: Subject to any disclaimer, the term of this patent is extended or adjusted under 35 U.S.C. 154(b) by 1455 days.

(21) Appl. No.: 11/011,295

(22) Filed: Dec. 13, 2004

(65) Prior Publication Data

US 2006/0126476 A1    Jun. 15, 2006

(51) Int. Cl.
    *G01B 9/02* (2006.01)
(52) U.S. Cl. .......................... 356/507; 356/485
(58) Field of Classification Search .................. 356/507
    See application file for complete search history.

(56) References Cited

U.S. PATENT DOCUMENTS

| | | | | |
|---|---|---|---|---|
| 3,635,552 A | * | 1/1972 | de Lang | 356/495 |
| 4,681,447 A | * | 7/1987 | Davidson | 356/485 |
| 5,280,340 A | | 1/1994 | Lacey | |
| 5,457,534 A | | 10/1995 | Lacey | |
| 5,473,431 A | * | 12/1995 | Hollars et al. | 356/507 |
| 5,557,399 A | | 9/1996 | de Groot | |
| 5,596,409 A | * | 1/1997 | Marcus et al. | 356/479 |
| 5,638,178 A | | 6/1997 | Lacey | |
| 5,715,060 A | | 2/1998 | Sides | |
| 5,777,740 A | | 7/1998 | Lacey | |
| 5,793,480 A | * | 8/1998 | Lacey et al. | 356/73 |
| 5,932,887 A | | 8/1999 | Guzik | |
| 5,949,546 A | * | 9/1999 | Lee et al. | 356/492 |
| 6,184,992 B1 | | 2/2001 | Duran | |
| 6,184,993 B1 | | 2/2001 | Duran | |

OTHER PUBLICATIONS

Refraction Index List of various 3D Modelers, RobinWood.com printed Mar. 25, 2009.*
Hansen, Wilford N., "Electric Fields Produced by the Propagation of Plane Coherent Electromagnetic Radiation in a Stratified Medium," Journal of the Optical Society of America, vol. 58, No. 3, pp. 380-390, Mar. 1968.
Strunk, C.W., Lo, J.L., and Sides, P.J., "Calibration of Fly Height Measured by Scattered Total Internal Reflection," IEEE Transactions on Magnetics, vol. 36, No. 5, pp. 2727-2729, Sep. 2000.

* cited by examiner

*Primary Examiner*—Gregory J Toatley, Jr.
*Assistant Examiner*—Rebecca C Slomski (57) ABSTRACT

An apparatus and a method for measuring very small separations between a transparent or semi-transparent first body and a second body, wherein one or more light sources produce light that is split into two distinct paths. One path is directed through the first body at two locations, one where it reflects from the interface at the separation to be measured, and another where the second body does not affect the reflection. The second path is directed at a frequency shifter, which shifts the frequency of the light. The two paths are recombined and interferometric variations of intensity, substantially at the frequency of the shifter, are detected. The difference in phase between the measurement and reference areas with the second body not present is subtracted from the difference in phase between the measurement and reference areas with the second body present. The difference in differences yields the phase change that occurs when the second body is introduced. Using this phase change and the optical properties of the bodies and the medium between them, the separation is calculated. The preferred embodiment applies to the field of magnetic recording on hard disk drives and is used to measure the spacing or "flying height" between a transparent or semi-transparent replica of a magnetic recording disk and an actual recording head.

17 Claims, 10 Drawing Sheets

DYNAMIC FRINGE PHASE DETECTION FOR MEASUREMENT OF VERY SMALL SPACING

FIELD OF THE INVENTION

The present invention relates to measurement of very small separations between bodies, in particular, to the measurement of very small separations between a rotating disk and a disk read/write head.

BACKGROUND OF THE INVENTION

The present invention is a method and apparatus for measuring the distance between two surfaces. The preferred embodiment illustrates the method and apparatus applied in the field of hard-disk magnetic recording for performing head/disk spacing or "flying height" measurements with substantially improved accuracy at very low flying heights compared to the current industry-standard methods.

Hard disk drives contain recording heads that read and write magnetic data to a rotating disk. The recording heads contain aerodynamic features that create an air bearing which controls the separation between the heads and disk. The thickness of the air bearing, or spacing between the head and disk is commonly referred to as "flying height." The flying height greatly impacts the performance of a head. As flying height is reduced, data density on the disk can be increased significantly. However, the head must not contact the disk excessively or wear may occur, possibly leading to read/write failure. In order to verify head design and monitor production processes, the flying height of hard drive magnetic heads is frequently measured on a flying height tester.

Flying height testers commonly use a rotating transparent replica of the magnetic disk together with an actual magnetic recording head. In general, a measurement beam (1 or more) from a light source is projected through the disk onto the air bearing surface of the recording head and the reflected beam is analyzed to derive the flying height.

The current industry standard, DFHT IV (Dynamic Flying Height Tester-IV) distributed by the KLA-Tencor Corporation (Lacey U.S. Pat. No. 5,280,340) uses 1 multi-wavelength light source at normal incidence to the disk to produce interference at the head/disk interface. Three wavelengths are filtered from the reflected light and the intensities are analyzed to derive the flying height. This technique requires calibration of the light source intensity and the reflectance of the disk and air bearing surfaces. The calibration process involves mechanically separating the head from the disk. A perfect calibration requires the head to remain parallel to the disk and not translate during the separation process. Unfortunately, it is not possible to perform this calibration perfectly, without introducing any error. As the flying height decreases, the calibration error causes a greater error in flying height measurement. This condition has made many users aware that the accuracy of the DFHT IV flying height tester is not sufficient for many current and future head designs. While the DFHT IV flying height tester has been a great commercial success over the past 10 years, its commercial viability is becoming questionable for the ever-decreasing flying heights that are becoming common in the industry.

De Groot, U.S. Pat. No. 5,557,399, discloses a flying height tester that was distributed by the Zygo Corporation under the name Pegasus. The Pegasus flying height tester used polarization interferometry to measure flying height. The technique involves directing a laser at an oblique angle through the disk onto the head. The polarization state of the beam is known before it enters the disk. The beam reflected from the head is analyzed for polarization and phase changes and flying height is derived from that data. This technique has two significant difficulties. (1) The stress in the spinning glass disk causes birefringence that affects the data and is difficult to compensate for in calculations. (2) The oblique angle of incident light makes it difficult to locate the measurement spot with the required precision. Perhaps because of these reasons, the Pegasus flying height tester had little commercial success.

Lacey, et al. U.S. Pat. No. 5,638,178 disclose an FHT using an imaging polarimeter. This technique was also adversely affected by stress-induced birefringence in the disk. While this technique theoretically provided advantages over the DFHT IV flying height tester distributed by the KLA-Tencor corporation, its performance was sub-par and it was not accepted in the industry.

Sides, U.S. Pat. No. 5,715,060, (the 060 patent) discloses a method for measuring flying height by sensing scattered light from frustrated total internal reflection. A light beam is directed through the edge of the disk onto the head air bearing surface. The incident angle of the beam striking the head is selected to produce total internal reflection. As described in "Calibration of Fly Height Measured by Scattered Total Internal Reflection" by Strunk, Low and Sides (IEEE Transactions on Magnectic Vol 36, No 5, September, 2000), the total internal reflection produces an evanesent wave on the far side of the transparent disk, where the head flies. Any material very close to the disk may interact with the evanesent wave, frustrating the total internal reflection. In particular, a typical magnetic recording head will frustrate the total internal reflection and furthermore, scatter some of the light which would have otherwise been totally internally reflected. In the 060 patent, Sides teaches that the scattered light intensity can be measured by a photo detector. The intensity of the scattered light changes as the spacing between the disk and magnetic head changes, thus this effect can be used to measure flying height. The practical difficulty in applying this technique occurs when calibrating the scattered light. Several methods are suggested in the 060 patent but they all have significant disadvantages. One method requires contacting the head and disk which can be distructive. Another method is flying the head at a known height, which requires a separate flying height measurement the method of which is unknown, or using a calibration standard that potentially does not have sufficient resolution. Even if the calibration issue was addressed, it is not clear that this technique would provided a significant improvement compared to the commercially available DFHT IV flying height tester's performance at today's very low flying heights.

Guzik, U.S. Pat. No. 5,932,887, teaches a method for measuring flying height by sensing frustrated total internally reflected light. A light beam is directed through the edge of the disk onto the head air bearing surface. The incident angle of the beam striking the head is selected to produce total internal reflection. The head material frustrates the total internal reflection. The amount of reflected light is measured and flying height is calculated. This technique has several difficulties: it is not easy to capture the internally-reflected light. The requirements for the light entry into and exit from the disk place restrictions on the disk hub design and the positions where the head may fly on the disk. Furthermore, the signals produced by the system are difficult to translate into a very accurate flying height, especially at the very low flying heights of today's head designs.

Duran, U.S. Pat. No. 6,184,993, teaches the use of a Savart plate to split an interferometric image of the head/disk interface into polarized ordinary and extraordinary beams. These beams were then retarded with respect to each other by shifting optical components in the apparatus. After shifting, the beams are superimposed and their interference is detected. The interferometric intensity is detected at a variety of phase shifts, then the phase at a giving system configuration is calculated from the data. This phase is compared to the phase measured with no head present and the flying height is calculated from the resultant phase measurements. As disclosed, this method has limitations on the possible measurement locations on the head, as the superimposed images must meet in a specific way to make the measurement. It also may be difficult to control system drift as the phase would be significantly affected by very small optical path variations caused by thermal expansion and other factors. In any case, this system has yet to prove commercial viability as it has been over five years since the patent was filed.

The present invention overcomes most of the limitations of the prior art. It does not require a spacing-varying calibration as does the current industry-standard DFHT IV flying height tester distributed by the KLA-Tencor corporation. It also does not make use of polarized light, so it is immune to the difficulties caused by stress-induced birefringence in the spinning glass disk. Furthermore the technique can be performed at substantially normal incidence to the head/disk interface so the precision of spot location is not compromised as it can be on non-normal incidence systems. Another advantage of this technique is that the sensitivity increases as the spacing approaches zero, whereas the sensitivity decreases as the spacing approaches zero on the current industry-standard DFHT IV flying height tester.

SUMMARY OF THE INVENTION

Spacing between a transparent (or semi-transparent) medium and a reflecting object is measured using the apparatus and method disclosed herein. Without limiting the scope of the transparent (or semi-transparent) medium and the reflecting object, they shall be referred to as the Disk and Head, respectively, in contemplation of an embodiment called a "Flying Height Tester" for application in the magnetic hard disk industry.

It is an advantage of the present invention to eliminate the spacing-varying calibration required by the DFHT IV flying height tester distributed by the KLA-Tencor corporation. Another advantage is that this invention does not require the use of polarized light, which can be adversely affected by stress-induced birefringence in a spinning glass disk. It is a further advantage of the present invention that the measurements are made at substantially normal incidence, allowing improved precision of measurement spot location compared to devices with optical configurations requiring non-normal incidence. It is still another advantage of the present invention to provide a device where the sensitivity improves as the spacing or flying height decreases below 10 nm.

Spacing or flying height is measured as follows. We define a Measurement Spot as a relatively small spot where the spacing between the Disk and Head is substantially constant. The phase of light reflecting from the Measurement Spot on the Disk with the Head in position at a relatively small spacing from the Disk is compared to the phase of light reflected from Measurement Spot on the Disk alone. Using the measured phase difference and the optical properties of the Head, Disk and medium between them, the spacing can be calculated.

Since the spacing is very small compared to dimensional variations caused by thermal expansion and other factors, the phase is always referenced to a secondary reflection (Reference Spot) on the Disk. The secondary reflection can be distinguished from the primary reflection in a number of ways. It can be located some distance away from the Measurement Spot. It can be located on the back-surface of the Disk. There are also many other methods to distinguish two light beams which are known to one with ordinary skill in the art. The important characteristic of the reflection at the Reference Spot is that it does not have an inherent phase change that is caused by removing the Head.

The phase at both the Measurement Spot and the Reference Spot is measured using an interferometric technique. Light is split and directed at two different areas. One area contains the Measurement Spot and the Reference Spot on the Disk. The other area is a Frequency Shifter. The Frequency Shifter can be composed of an optical component or mechanism that causes a relatively small shift in the frequency of the light. Examples of such a frequency shifting device would be an acusto-optic modulator or a moving reflecting object. The light reflecting from the Measurement Spot and the Reference Spot is combined with the light from the Frequency Shifter, and if properly aligned, dynamic interference fringes will result from the combination.

The intensity of the interference fringes corresponding to the Measurement Spot are measured and compared to the intensity of the fringes corresponding to the Reference Spot. Since the fringes are dynamic, they are changing in time and an analysis can yield the phase difference between the Measurement Spot fringes and the Reference Spot fringes.

However, it is not the phase difference between the Measurement Spot fringes and the Reference Spot fringes that is of primary interest. The primary interest is the difference between the phase of the light reflected from the Measurement Spot with the Head present (loaded) and the Measurement Spot with the Head not present (unloaded). However, it is not possible to directly compare the phase of these measurements, as they are not taken at the same time. Therefore, in each case (with the Head present and with the Head not present), the phase of the Measurement Spot fringes is found with respect to the Reference Spot fringes. The difference between these two Measurement Spot fringe phases with respect to the Reference Spot fringe phases yields the parameter of primary importance, the phase change caused by the presence of the Head near the Disk.

The phase difference between the Measurement Spot fringes and Reference Spot fringes is affected by a large number of factors including the difference in length between the two optical paths. The phase difference between the reference and measurement spot consists of K, a substantially constant value cause by optical path length differences and other factors, and in the case where the Head is present, the phase shift caused by the additional reflection at the surface of the Head.

In the case where the Head is not present, the phase difference between Measurement Spot and Reference Spot is the substantial constant K. When the head is present, the phase difference between the Measurement Spot and the Reference Spot is K+D, where D is the phase shift caused by the additional reflection from the Head. Taking the difference between the two differences, that is the difference of the Measurement Spot and Reference Spot with the Head loaded, minus the difference of the Measurement Spot and Reference Spot with the head unloaded, yields (K)−(K−D), or D itself. This D is the phase change caused by the presence of the Head near the Disk.

With the phase change due to introduction of the Head known as well as the optical properties of the Disk, the Head, and the medium between them, the spacing or flying height can be calculated by comparing the measured phase with the theoretical phase versus spacing relationship. The phase and associated spacing or flying height can be measured many times at high speed and parameters such as average spacing, minimum spacing, maximum spacing and others can be calculated.

In one aspect the disclosed method for measuring the spacing between a first body and a second body includes producing at least two beams of electromagnetic radiation, including a measurement beam and a reference beam. The measurement beam is separated into a first measurement portion and a second measurement portion. The reference beam is separated into a first reference portion and a second reference portion. The first measurement portion is directed to impinge upon the first and second bodies along at least a portion of a measurement radiation path. The second measurement portion is directed to impinge upon a third body. The first reference portion is directed to impinge upon the first body but not the second body. The second reference portion is directed to impinge upon the third body. Electromagnetic radiation from the measurement beam that is reflected from the first, second, and third bodies, is detected and a corresponding first output signal is produced. Electromagnetic radiation from the reference beam that is reflected from the first and third bodies, is detected and a corresponding second output signal is produced. The second body is held in the measurement radiation path during a first period. The second body is held away from the measurement radiation path during a second period. A phase difference between the first and second output signals during the first period is compared with a phase difference between the first and second output signals during the second period, and the spacing is determined based on the phase difference comparison.

In another aspect the disclosed apparatus for measuring the spacing between a first body and a second body includes at least one source of electromagnetic radiation and source optics, producing at least two electromagnetic radiation beams. At least one beam splitter separates a measurement beam into a first measurement portion and a second measurement portion, and separates a reference beam into a first reference portion and a second reference portion. A measurement radiation path directs the first measurement portion to impinge upon the first and second bodies, and directs the second measurement portion to impinge upon a third body. A reference radiation path directs the first reference portion to impinge upon the first body but not the second body, and directs the second reference portion to impinge upon the third body. A first detector is disposed to receive radiation that is reflected from the first, second, and third bodies via the measurement radiation path, and produces a first output signal. A second detector is disposed to receive radiation that is reflected from the first and third bodies via the reference radiation path, and produces a second output signal. A movable mount can hold the second body in the measurement radiation path during a first period, and can hold the second body away from the measurement radiation path during a second period. A phase difference comparator is coupled to the first and second detectors, and is capable of comparing a phase difference between the first and second output signals during the first period with a phase difference between the first and second output signals during the second period.

BRIEF DESCRIPTION OF THE DRAWINGS

These and further features according to the present invention will be better understood with the following drawing figures, taken together with the Detailed Description, wherein.

DETAILED DESCRIPTION OF THE INVENTION

Figure 1:
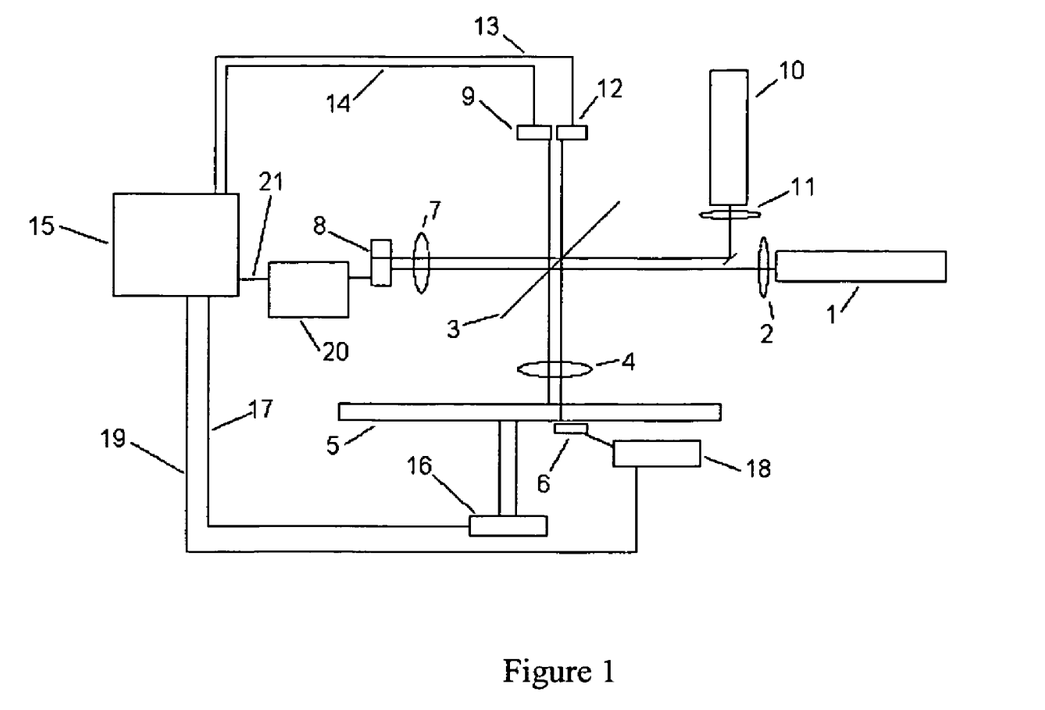
FIG. 1 is a block diagram of one embodiment of the measurement system according to the present invention.

Light from first laser 1 is directed through focus optics 2 toward beam splitter 3. The beam splitter 3 directs a portion of the light toward the top surface of disk 5 through focus optics 4, and another portion of the light toward the top surface of the vibrating reflecting component (frequency shifter) 8 through focus optics 7. The beam reflects from the vibrating reflecting component 8, as well as the top surface of the disk 5 and is recombined at the beam splitter 3. The beams interfere and the interferometric intensity is detected at first photo-diode detector 9. The interferometric intensity at detector 9 is referred to as the Reference.

In a similar fashion, light from second laser 10 is directed through focus optics 11 toward beamsplitter 3. Beamsplitter 3 directs a portion of the light to the interface between the head 6 and the disk 5, and a portion of the light toward the back surface of the vibrating reflecting component 8. These beams reflect and the two reflections are recombined at the beam splitter 3 and directed toward a second photo-diode detector 12. The interferometric intensity recorded at detector 12 is referred to as the Measurement.

In the preferred embodiment, the vibrating reflecting component 8 is substantially the same material and thickness as disk 5. The optics 4 and 7 are also substantially identical, such that the beamsplitter 3 and optics 4 and 7 combine to produce a "Linnik interferometer" with a vibrating reference mirror to produce dynamic interference fringes.

The signals from detectors 9 and 12 are carried by signal wires 13 and 14 respectively to system controller 15 which includes an analog-to-digital converter, digital memory, and a microprocessor-based signal combiner to record and analyze the output from detectors 9 and 12.

The disk 5 is rotated by spindle motor 16 which is controlled by system controller 15 using control wires 17.

The head 6 is mechanically attached to head actuator 18. In the preferred embodiment, head actuator 18 is a linear stage driven by a lead screw rotated by an electric motor. Head actuator 18 is controlled by system controller 15 using control wires 19.

In the preferred embodiment, the vibrating reflecting component 8 is mechanically attached to a voice-coil actuator 20. The voice coil actuator 20 is controlled by system controller 15 using control wires 21.

The motion of the vibrating reflecting component 8 is synchronized with the rotation of the disk 5, because axial runout of the disk 5 and thickness variation of the disk 5 produces a similar type of dynamic interference fringe activity as the motion of the vibrating reflecting component 8. By synchronizing the motion of the vibrating reflecting component 8 and the rotating disk 5 using system controller 15, control wires 19 and 21, head actuator 18 and voice-coil actuator 20, the signals detected by detector 9 and detector 12 are substantially repeatable from revolution to revolution of the disk 5 allowing a simplified analysis of the data. In the preferred embodiment, the motion of the vibrating reflecting component 8 is synchronized by using a microprocessor-based controller 15 that receives an index pulse from the spindle motor 16 that spins the disk 5. The index pulse occurs once per revolution of the disk. The system controller 15 is programmed to actuate the voice coil actuator 20 with a sinusoidal current that produces one cycle of current per revolution of the disk 5, thereby causing the vibrating reflecting component 8 to move through one cycle of motion synchronously with one revolution of the disk 5. The system controller 15 can be programmed for different rotational speeds of the disk 5 and it can be programmed to change the phase of the motion of the vibrating reflecting component 8 with respect to the disk 5.

While the preferred embodiment uses two lasers 1, 10 and a vibrating optical component 8, this method may also be applied with variations of hardware. For example, a single light source could illuminate the Measurement Spot and Reference Spot in lieu of the first laser 1 and second laser 10. Also, an acusto-optic modulator could be used in lieu of the vibrating reflecting component 8. Furthermore, it is possible to implement this method using a stationary reflecting component in place of the vibrating reflecting component 8. In this case the axial runout of the disk 5 acts to shift the frequency of the light relative to the reflection from the stationary reflecting component.

To make a measurement, the fringe intensity at both the measurement detector 12 and the reference detector 9 is recorded by the system controller 15 for a period of time with the head 6 in close proximity to the disk 5 in the field of view of the optical system. The fringe intensity at both detector 9 and detector 12 is also recorded for a period of time with the head 6 displaced from the field of view of the optical system. The head 6 is displaced by head actuator 18 under control of the system controller 15.

Figure 2A:
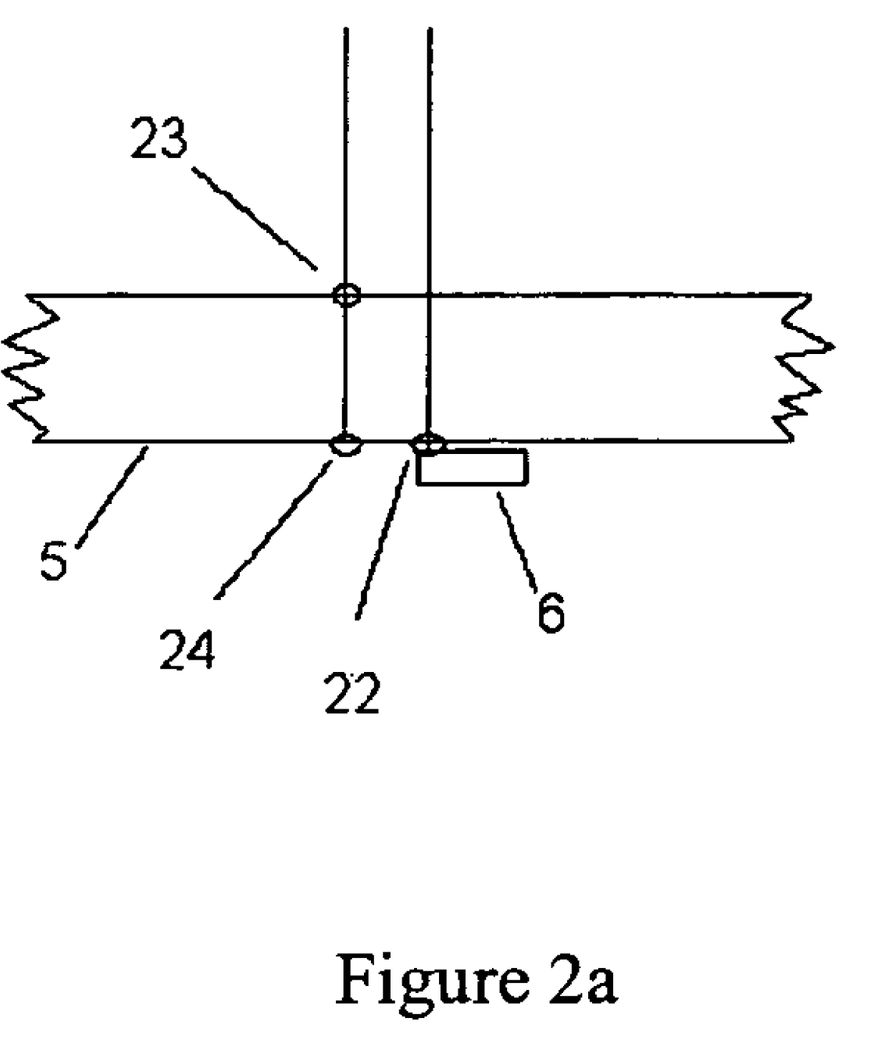
FIG. 2a shows the Measurement Spot and Reference Spot with the Head present according to the embodiment of FIG. 1.

FIG. 2a illustrates the configuration with the head 6 in the field of view. The measurement spot 22 is located at the interface between the head 6 and disk 5. The reference spot 23 is on the disk 5 but is not affected by the head 6. An alternate reference spot 24 is also shown on the bottom surface of the disk 5.

Figure 2B:
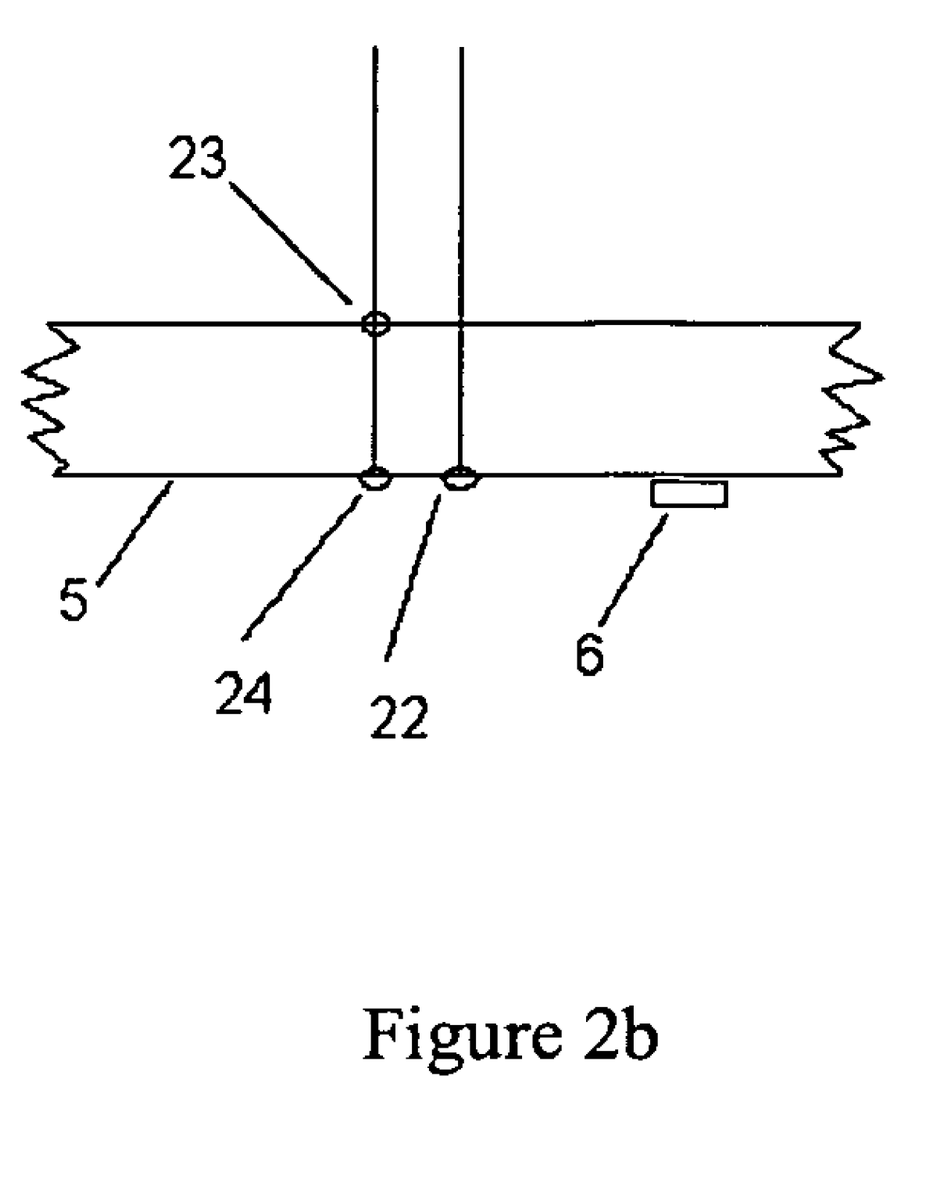
FIG. 2b shows the Measurement Spot and Reference Spot with the Head not present (out of the field of view) according to the embodiment of FIG. 1.

FIG. 2b illustrates the configuration with the head 6 out of the field of view of the optical system. In this case, the head 6 has no effect on the measurement spot 22.

Figure 3:
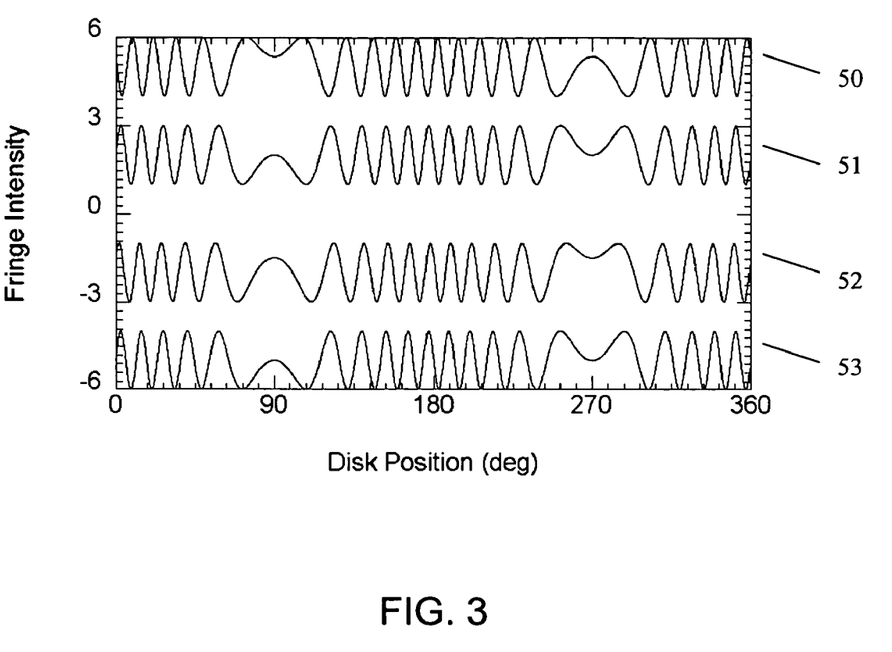
FIG. 3 is a plot of simulated output from the detectors, 4 sets of data from the Measurement Spot and Reference Spot in both conditions of Head present and Head not present according to the embodiment of FIG. 1.

Data set 50 and data set 51 illustrate simulated fringe intensity corresponding to measurement photo detector 12 and reference photo detector 9 respectively with the head 5 in the field of vision. Data set 52 and data set 53 illustrate fringe intensity corresponding to the same detectors with the head 5 displaced from the field of vision. These data sets are representative of one revolution of the disk 5.

We denote the signal recorded corresponding to the measurement spot 22 with the head in the field of vision (exemplified by data set 50) as Sa. The signal recorded simultaneously corresponding to the reference spot 23 (exemplified by data set 51) is denoted Sb. A subsequent measurement with the head 6 out of the field of vision yields, Sc, the data corresponding to the measurement spot 22 (exemplified by data set 52), and Sd the data corresponding to the reference spot 23 (exemplified by data set 53). While shown in the figure displaced vertically for clarity, all four sets of data are normalized to a maximum of +1.0 and a minimum of −1.0.

Figure 4:
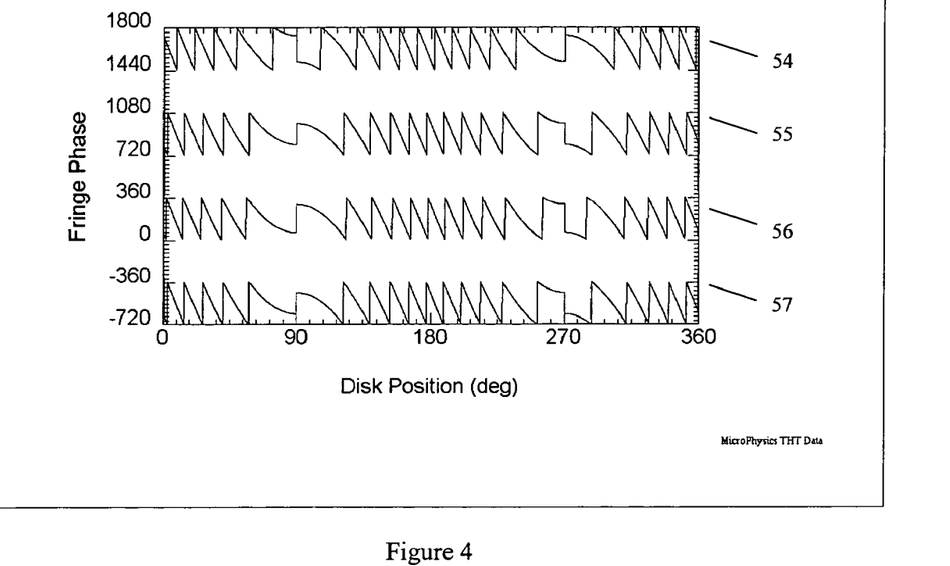
FIG. 4 is a plot of the 4 sets of phase data calculated from the 4 sets of data in FIG. 3.

The phase data corresponding to Sa 50, Sb 51, Sc 52 and Sd 53 are denoted Pa 54, Pb 55, Pc 56 and Pd 57 respectively. The units of Px are degrees in the plots. These phase data are calculated point by point using the following equations $Px = \text{arcCosine}(Sx)$ if the slope of Sx is positive $Px = 2 PI - \text{arcCosine}(Sx)$ if the slope of Sx is negative    Eq. 1

In Equation 1, the subscript x is taken to be used as each of the subscripts a, b, c and d independently. The slope can be determined by examining neighboring points in each data set. The vertical values of each data set 54, 55, 56 and 57 range from 0 to 360 degrees, but they are shown displaced vertically for clarity.

Figure 5:
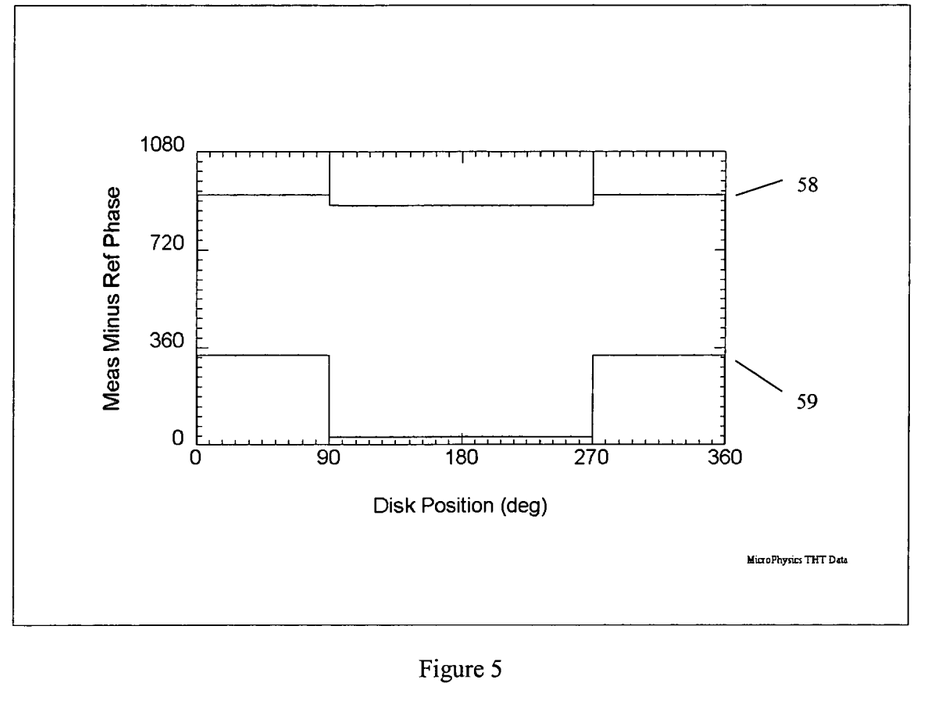
FIG. 5 is a plot of 2 sets of data, the Measurement Spot phase data minus the Reference Spot phase data for both conditions, Head present and Head not present according to the embodiment of FIG. 1.

The data set 58 illustrates the phase corresponding to the measurement spot 22 (data set 54) minus the phase corresponding to the reference spot 23 (data set 55) with the head 5 in the field of view. Similarly, the data set 59 illustrates the phase corresponding to the measurement spot 22 (data set 56) minus the phase corresponding to the reference spot 23 (data set 57) with the head 5 out of the field of view. The vertical axis units of phase for data sets 58 and 59 are degrees. As the phase units are periodic, any negative phase values can be made positive by adding 360 degrees for convenience in further calculations. Both data sets 58 and 59 have a vertical range from 0 to 360 degrees although data set 58 is shown displaced vertically for clarity.

Figure 6:
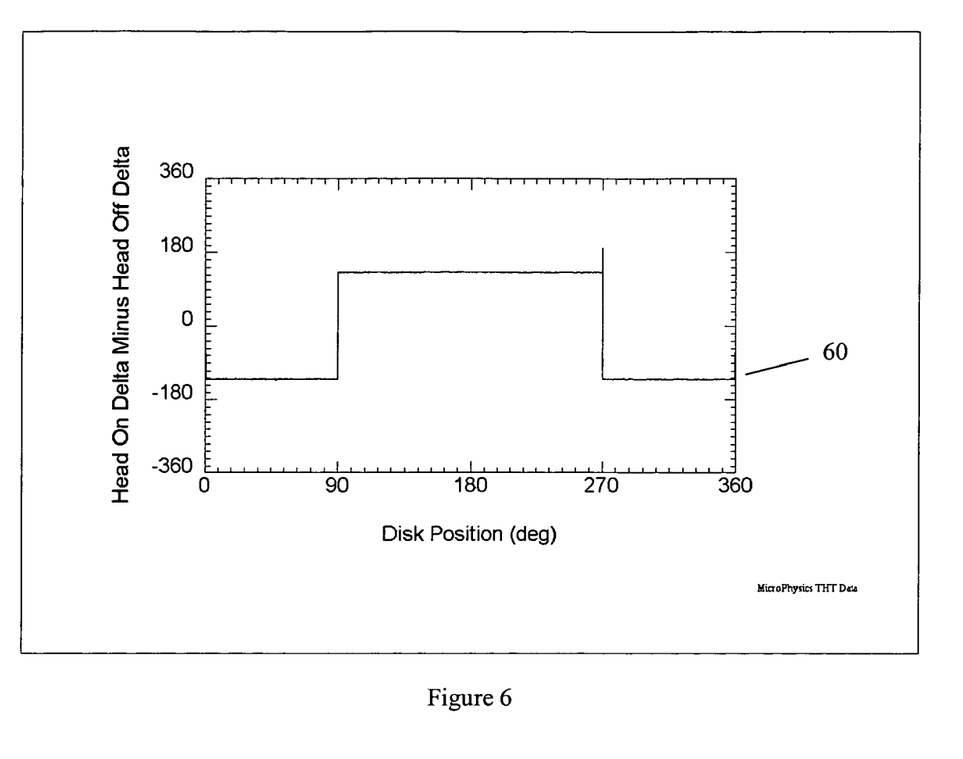
FIG. 6 is a plot of the difference between the two sets of data in FIG. 5.

Data set 60 is data set 58 minus data set 59. This is the difference of differences which yields the actual change in phase caused by introducing the head 6 into the field of view. As the phase is periodic, this data is bounded from −180 degrees to +180 degrees by adding or subtracting 360 degrees if necessary for convenience in further calculations.

Note that there is an ambiguity in the selection of the sign of this result depending on the sign of the shift in frequency caused by the vibrating reflecting component 8. Specifically, for one direction of motion of the vibrating reflecting component 8, the correct phase caused by the introduction of the head 6 is the data set 58 minus the data set 59. When the vibrating reflecting component 8 is moving in the opposite direction, the correct phase is data set 59 minus the data set 58.

The change in direction of the vibrating reflecting component 8 is clearly indicated by the discontinuities at disk rotational positions of 90 degrees and 270 degrees in these sets of data. From the theoretical phase versus spacing relationship, we know that the phase caused by introducing a low flying head (less than 50 nm) into the field of view is between 0 and 180 degrees. By analyzing data with a known low flying head (less than 50 nm) we determine that on data set 60, the data in the range of 0 to 90 degrees and the data in the range of 270 through 360 degrees is of the incorrect sign.

Figure 7:
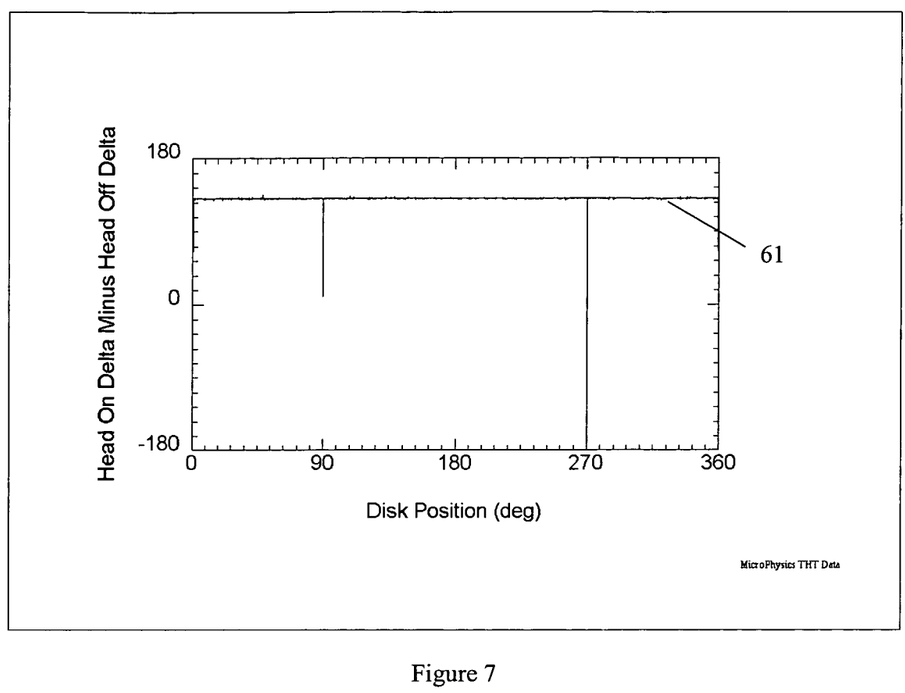
FIG. 7 is a plot of the FIG. 6 data, compensated for the change in direction of the vibrating reflecting component.

Data set 61 illustrates the phase data set 60 compensated by changing the sign of the data corresponding to disk rotational positions of 0 through 90 degrees and 270 through 360 degrees. To convert the measured phase exemplified by data set 61 into flying height, we generate a look-up table of phase vs. flying height. In the preferred embodiment, the matrix-method calculations described in "Electric Fields Produced by the Propagation of Plane Coherent Electromagnetic Radiation in a Striated Medium", J. of Optical Society of America, vol. 58(3), March 1968, pp. 380-390, is used. Using these calculations, the look-up table can be generated for heads with one or more coatings as well as disks with one or more coatings so long as the optical properties and thickness of the coatings on the head and disk are known. Also, the optical properties of the matter in the spacing can be arbitrary, although in the preferred embodiment, it is air. A look-up table of flying height vs. phase for typical magnetic head and transparent disks with air in the spacing is partially given in Table 1

TABLE 1

| Spacing (nm) | Phase (deg) |
| --- | --- |
| 0 | 147.86 |
| 1 | 145.51 |
| 2 | 143.20 |
| 3 | 140.94 |
| 4 | 138.72 |

In the preferred embodiment, the look up table is generated for each one-tenth of a nm. One-tenth of a nm is one Angstrom.

Figure 8:
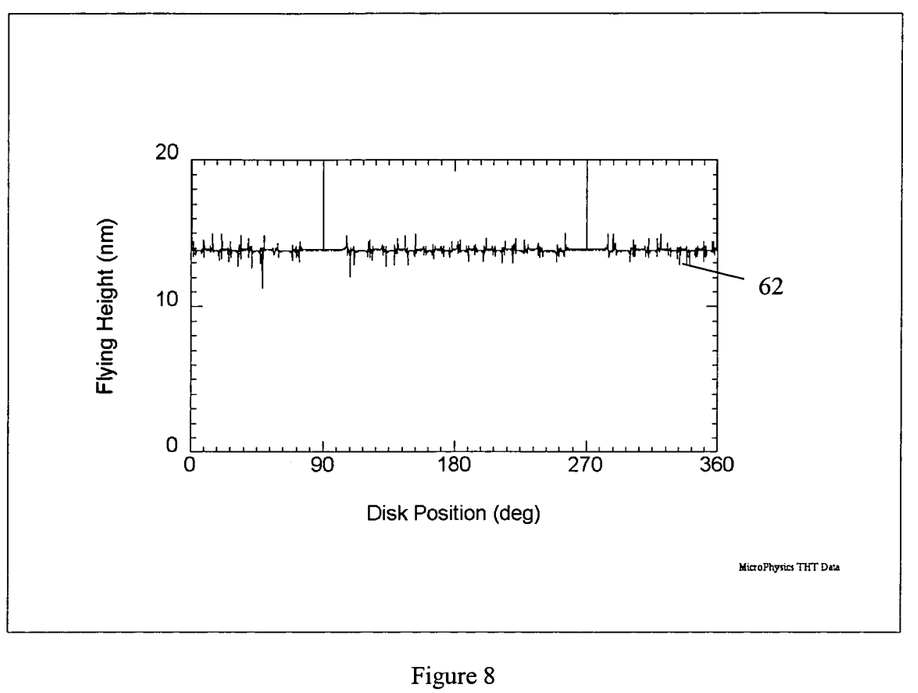
FIG. 8 is a plot of the spacing or flying height calculated from the phase data in FIG. 7.

Data set 62 shows the spacing or flying height calculated from the phase data set 61 using the look up table method. The data set 62 shows that an error can occur on calculations where the vibrating reflecting component 8 is changing directions at disk 5 rotational positions of 90 and 270 degrees. This error is typically caused by an incorrect calculation of slope in equation 1 where the slope is very close to zero. The spacing or flying height at disk rotational positions of 90 and 270 degrees can be more accurately measured by altering the phase of the vibrating reflecting component 8 with respect to the rotational position of the disk 5, for example by setting the change in direction to occur at 0 and 180 degrees of disk 5 rotation using system controller 15. Alternatively, a constant frequency shifter such as an acusto-optic modulator would not be subject to such errors, because the sign of the frequency shift would be constant.

It should be noted that the use of an acusto-optic modulator type of frequency shifter would be an advantage in that there would be no errors in the data as there can be when the vibrating reflecting component 8 shifts direction. In the preferred embodiment, the ease of integrating the vibrating reflecting component 8 was judged to be more important than the difficulty introduced by the variation in frequency shifting caused by its direction reversal.

Figure 9:
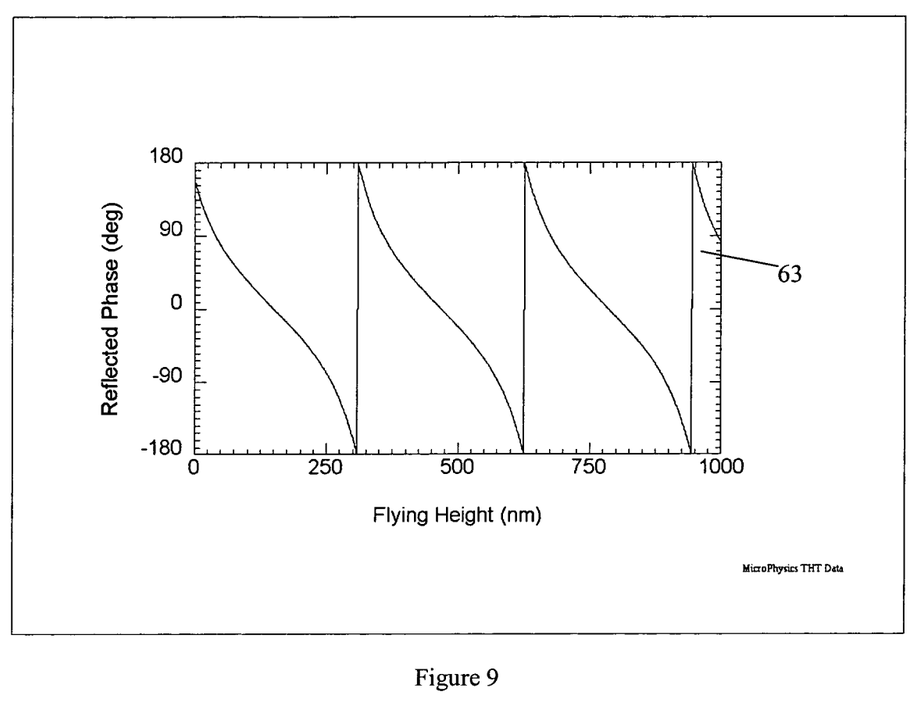
FIG. 9 is a plot of theoretical phase versus spacing or flying height.

A more complete set of theoretical phase versus spacing or flying height given by Table 1 is plotted as data set 63. Data set 63 shows that the phase is a periodic function of flying height, with a period of half the wavelength of the light. If the flying height is not known to be below approximately 300 nm, additional information to determine the correct cycle of the solution must be incorporated. For this purpose, a target spacing may be specified by the user of the system for which the solution will be in the range of the specified target spacing plus or minus one-quarter of the wavelength of light being used. Or another technique such as white-light interferometry may be used to determine the approximate spacing, then that approximate spacing would be treated as the target spacing mentioned above. With reference to data set 63, it should be noted that the slope of the phase versus spacing or flying height is greatest at very low spacing values (below 20 nm). Furthermore, this increased slope continues to zero spacing. The increased slope at very low spacing or flying height values causes an increase in measurement sensitivity as the spacing decreases to zero, which is a great advantage of this method compared to other methods used to measure spacing or flying height.

Modifications and substitutions made by one of ordinary skill in the art are within the scope of the present invention which is not to be limited, except by the claims that follow.

What is claimed is:

1. An apparatus for measuring the spacing between a first body and a second body comprising:
   at least one source of light;
   source optics producing at least two light beams from the at least one source, including a measurement light beam and a reference light beam;
   at least one beam splitter that separates the measurement light beam into a first measurement portion and a second measurement portion, and that separates the reference light beam into a first reference portion and a second reference portion;
   a measurement optical path that directs the first measurement portion to shine upon the first and second bodies, and that directs the second measurement portion to shine upon a third body;
   a reference optical path that directs the first reference portion to shine upon the first body but not the second body, and that directs the second reference portion to shine upon the third body;
   a first light detector disposed to receive light that is reflected from the first, second, and third bodies via the measurement optical path, and that produces a first output signal;
   a second light detector disposed to receive light that is reflected from the first and third bodies via the reference optical path, and that produces a second output signal;
   a movable mount that can hold the second body in the measurement optical path during a first period, and that can hold the second body away from the measurement optical path during a second period;
   a phase difference comparator coupled to the first and second light detectors, capable of comparing a phase difference between the first and second output signals during the first period with a phase difference between the first and second output signals during the second period, and
   an actuator that moves the third body and thereby creates a frequency shift in the second measurement portion and a substantially identical frequency shift in the second reference portion.

2. An apparatus for measuring the spacing between a first body and a second body comprising:
   at least one source of light;
   source optics producing at least two light beams from the at least one source, including a measurement light beam and a reference light beam;
   at least one beam splitter that separates the measurement light beam into a first measurement portion and a second measurement portion, and that separates the reference light beam into a first reference portion and a second reference portion;
   a measurement optical path that directs the first measurement portion to shine upon the first and second bodies, and that directs the second measurement portion to shine upon a third body;

a reference optical path that directs the first reference portion to shine upon the first body but not the second body, and that directs the second reference portion to shine upon the third body;

a first light detector disposed to receive light that is reflected from the first, second, and third bodies via the measurement optical path, and that produces a first output signal;

a second light detector disposed to receive light that is reflected from the first and third bodies via the reference optical path, and that produces a second output signal;

a movable mount that can hold the second body in the measurement optical path during a first period, and that can hold the second body away from the measurement optical path during a second period;

a phase difference comparator coupled to the first and second light detectors, capable of comparing a phase difference between the first and second output signals during the first period with a phase difference between the first and second output signals during the second period, wherein the third body is a acousto-optic modulator.

3. The apparatus of claim 1 wherein the third body has a coefficient of refraction that is substantially the same as the first body.

4. The apparatus of claim 1 wherein the third body has a thickness that is substantially the same as the first body.

5. The apparatus of claim 1 including a motor that rotates the first body, and at least a substantial portion of the movement of the third body repeats itself with each rotation of the first body.

6. A method for measuring the spacing between a first body and a second body comprising the acts of:

producing at least two light beams, including a measurement light beam and a reference light beam;

separating the measurement light beam into a first measurement portion and a second measurement portion;

separating the reference light beam into a first reference portion and a second reference portion;

directing the first measurement portion to shine upon the first and second bodies along at least a portion of a measurement optical path;

directing the second measurement portion to shine upon a third body;

directing the first reference portion to shine upon the first body but not the second body;

directing the second reference portion to shine upon the third body;

detecting light from the measurement light beam that is reflected from the first, second, and third bodies, and producing a corresponding first output signal;

detecting light from the reference light beam that is reflected from the first and third bodies, and producing a corresponding second output signal;

holding the second body in the measurement optical path during a first period;

holding the second body away from the measurement optical path during a second period;

comparing a phase difference between the first and second output signals during the first period with a phase difference between the first and second output signals during the second period;

determining the spacing based on the phase difference comparison; and introducing a frequency shift in the second measurement portion and a substantially identical frequency shift in the second reference portion.

7. The method of claim 6 wherein the third body is an acousto-optic modulator, and wherein the act of introducing a frequency shift is accomplished by the acousto-optic modulator.

8. The method of claim 6 wherein the act of introducing a frequency shift is accomplished by moving the third body.

9. The method of claim 8 further comprising rotating the first body, and wherein at least a substantial portion of the movement of the third body repeats itself with each rotation of the first body.

10. An apparatus for measuring the spacing between a first body and a second body comprising:

at least one source of electromagnetic radiation;

source optics producing at least two electromagnetic radiation beams from the at least one source, including a measurement beam and a reference beam;

at least one beam splitter that separates the measurement beam into a first measurement portion and a second measurement portion, and that separates the reference beam into a first reference portion and a second reference portion;

a measurement radiation path that directs the first measurement portion to impinge upon the first and second bodies, and that directs the second measurement portion to impinge upon a third body;

a reference radiation path that directs the first reference portion to impinge upon the first body but not the second body, and that directs the second reference portion to impinge upon the third body;

a first detector disposed to receive radiation that is reflected from the first, second, and third bodies via the measurement radiation path, and that produces a first output signal;

a second detector disposed to receive radiation that is reflected from the first and third bodies via the reference radiation path, and that produces a second output signal;

a movable mount that can hold the second body in the measurement radiation path during a first period, and that can hold the second body away from the measurement radiation path during a second period;

a phase difference comparator coupled to the first and second detectors, capable of comparing a phase difference between the first and second output signals during the first period with a phase difference between the first and second output signals during the second period; and an actuator that moves the third body and thereby creates a frequency shift in the second measurement portion and a substantially identical frequency shift in the second reference portion.

11. An apparatus for measuring the spacing between a first body and a second body comprising:

at least one source of electromagnetic radiation;

source optics producing at least two electromagnetic radiation beams from the at least one source, including a measurement beam and a reference beam;

at least one beam splitter that separates the measurement beam into a first measurement portion and a second measurement portion, and that separates the reference beam into a first reference portion and a second reference portion;

a measurement radiation path that directs the first measurement portion to impinge upon the first and second bodies, and that directs the second measurement portion to impinge upon a third body;

a reference radiation path that directs the first reference portion to impinge upon the first body but not the second body, and that directs the second reference portion to impinge upon the third body;

a first detector disposed to receive radiation that is reflected from the first, second, and third bodies via the measurement radiation path, and that produces a first output signal;

a second detector disposed to receive radiation that is reflected from the first and third bodies via the reference radiation path, and that produces a second output signal;

a movable mount that can hold the second body in the measurement radiation path during a first period, and that can hold the second body away from the measurement radiation path during a second period; and a phase difference comparator coupled to the first and second detectors, capable of comparing a phase difference between the first and second output signals during the first period with a phase difference between the first and second output signals during the second period;

wherein the third body is a acousto-optic modulator.

12. The apparatus of claim 10 wherein the third body has a thickness that is substantially the same as the first body.

13. The apparatus of claim 10 including a motor that rotates the first body, and at least a substantial portion of the movement of the third body repeats itself with each rotation of the first body.

14. A method for measuring the spacing between a first body and a second body comprising the acts of:

producing at least two beams of electromagnetic radiation, including a measurement beam and a reference beam;

separating the measurement beam into a first measurement portion and a second measurement portion;

separating the reference beam into a first reference portion and a second reference portion;

directing the first measurement portion to impinge upon the first and second bodies along at least a portion of a measurement radiation path;

directing the second measurement portion to impinge upon a third body;

directing the first reference portion to impinge upon the first body but not the second body;

directing the second reference portion to impinge upon the third body;

detecting electromagnetic radiation from the measurement beam that is reflected from the first, second, and third bodies, and producing a corresponding first output signal;

detecting electromagnetic radiation from the reference beam that is reflected from the first and third bodies, and producing a corresponding second output signal;

holding the second body in the measurement radiation path during a first period;

holding the second body away from the measurement radiation path during a second period;

comparing a phase difference between the first and second output signals during the first period with a phase difference between the first and second output signals during the second period;

determining the spacing based on the phase difference comparison; and introducing a frequency shift in the second measurement portion and a substantially identical frequency shift in the second reference portion.

15. The method of claim 14 wherein the third body is an acousto-optic modulator, and wherein the act of introducing a frequency shift is accomplished by the acousto-optic modulator.

16. The method of claim 14 wherein the act of introducing a frequency shift is accomplished by moving the third body.

17. The method of claim 16 further comprising rotating the first body, and wherein at least a substantial portion of the movement of the third body repeats itself with each rotation of the first body.

* * * * *